United States Patent Office 2,776,310
Patented Jan. 1, 1957

2,776,310

METHINE DYE AND PROCESS FOR ITS PREPARATION

James M. Straley and Ralph R. Giles, Kingsport, Tenn., assignors to Eastman Kodak Company, Rochester, N. Y., a corporation of New Jersey No Drawing. Application December 1, 1954, Serial No. 472,508

1 Claim. (Cl. 260—465)

This invention relates to a new acylated methine compound, the process for its preparation and its application to the art of dyeing or coloring.

We have discovered that the new methine compound p - (di - β - chloroacetoxyethyl)amino - o - methylbenzylidine methylcyanoacetate having the formula:

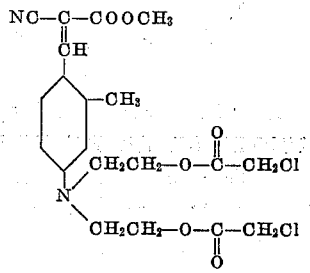

is a valuable dye for coloring textile materials made of or containing a cellulose carboxylic acid ester having two to four carbon atoms in the acid groups thereof. The dye compound of our invention when properly applied to the aforesaid textile materials gives greenish-yellow dyeings which are fast to gas and which are unusually fast to light. Further, the dye compound possesses good sublimation properies and has good affinity for the aforesaid textile materials. Although the new dye compound of our invention is of general utility for the coloration of the above-mentioned cellulose carboxylic acid ester textile materials, it is primarily of importance for the coloration of cellulose acetate textile materials.

We are aware that U. S. Patent 2,583,614 discloses acylated methine compounds having the formula:

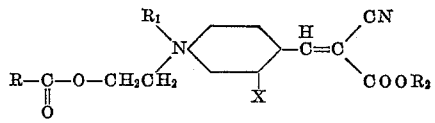

wherein R represent a methyl group, an ethyl group, a propyl group, a $CH_3$—O—$CH_2$— group or a $CH_3CH_2$—O—$CH_2$— group, $R_1$ represents an alkyl group having one to three, inclusive, carbon atoms, $R_2$ represents an alkyl group having one to four, inclusive, carbon atoms or a —$CH_2CH_2$—O—$R_3$ group, wherein $R_3$ represents an alkyl group having one to two, inclusive, carbon atoms and X represents a hydrogen atom or a methyl group and wherein when X is a methyl group $R_1$ may also be a

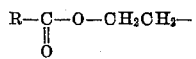

group, wherein R has the meaning previously assigned to it. These methine compounds yield greenish-yellow dyeings on cellulose acetate textile materials which have the desirable dyeing properties noted above in connection with the new acylated methine compound of the present invention.

However, it has been found in practice that these dyes are subject to oiling out of the dyebath at higher dyeing temperatures, i. e. about 80° C. and higher. This leads to not only loss of color but to serious spotting of the textile goods. These dyes do dye well at low temperatures but there are numerous instances where it is necessary to employ higher temperatures. To illustrate, the dye compound 1,8-dihydroxy-5-nitro-4-(p-β-hydroxyethylphenyl)aminoanthraquinone is a valuable blue dye for cellulose acetate textile materials but gives good money value and deep dyeings on cellulose acetate textile materials only at temperatures of 80° C. and higher. In order to obtain light- and gas-fast bright green dyeings using this dye a bright greenish-yellow dye such as the dyes of Example 1 (p-[di-β-acetoxyethyl]-amino-o-methylbenzylidene methylcyanoacetate) and Example 2 (p - [di - β - n - propoxyethyl]amino - o - methylbenzylidene methylcyanoacetate) of U. S. Patent 2,583,614 must be used. However, it is not practical to use these methine dyes simultaneously in combination with the aforesaid blue anthraquinone dye because at the higher temperatures required to secure good results with the blue anthraquinone dye these methine dyes oil out badly. Of course, a green dyeing can be obtained by dyeing the textile material separately with the blue dye and the yellow dye at different temperatures but this is quite expensive as regards time and man power as compared to an operation where the dyes required to obtain the desired color are applied simultaneously.

In contrast to the methine dye compounds of U. S. Patent 2,583,614 which oil out at temperatures of about 80° C. and higher the new methine dye of our invention does not oil out at the higher temperatures frequently necessary in mill usage for the dyeing of cellulose acetate textile materials and therefore presents an obvious advantage to the dyer. It could not have been predicted that the new methine compound of our invention would have the important advantage just discussed.

In purified form the new methine compound of our invention melts at about 126.7° C. Experiments show that the dye product of the invention must have a melting point above 120° C. if oiling out of the dyebath is to be prevented. The new methine dye compound is prepared by reacting p-(di-β-hydroxyethyl)amino-o-methylbenzylidene methylcyanoacetate with chloroacetyl chloride in the presence of an acid binding agent. Ordinarily, the reaction is carried out in the presence of an inert solvent. Acid agents, or acid acceptors as they are sometimes called, that can be used include inorganic alkaline agents such as sodium carbonate, potassium carbonate, sodium bicarbonate and potassium bicarbonate, for example. However, we have found that in order to directly obtain a product melting above 120° C., that is a product which does not oil out of the dyebath, an organic acid binding agent such as pyridine has to be employed. It will be understood, of course, that by purification of the dye product obtained when an inorganic acid binding agent is employed, a product melting above 120° C. likewise can be obtained. Purification can be effected by recrystallization, for example, from benzene or dilute aqueous acetic acid. However, by the use of an organic acid binding agent such as pyridine a dye product that does not oil out of the dyebath is obtained directly without the necessity of purification. Thus, the use of an organic binding agent is obviously advantageous.

The following example illustrates the preparation of the new methine compound of our invention.

12.5 grams of chloroacetyl chloride were added over a period of about 10 minutes to a well-stirred solution of 15.2 grams of p-(di-β-hydroxyethyl)amino-o-methylbenzylidene methylcyanoacetate in 50 cc. of benzene and 8.8 cc. pyridine. After the addition of the chloroacetyl chloride, the reaction mixture thus obtained was refluxed for 3 hours after which the solvent was removed under vacuum until a thick yellow mass was obtained. The reaction product was made fluid by the addition of about 25 cc. of cold methyl alcohol following which the reaction product was recovered by filtration, washed with a small amount of cold methyl alcohol and finally with water. 16.8 grams of p-(di-β-chloroacetoxyethyl)-amino-o-methylbenzylidene methylcyanoacetate were obtained as a yellow solid melting at 123° C.–124° C. Recrystallization from benzene or dilute acetic acid gave a product melting at 126.5° C.–126.7° C. As previously noted, this recrystallization is not necessary to obtain a product which does not oil out of the dyebath. The crude product melting at 123° C.–124° C. when dispersed in water with the usual dispersing agents such as sodium lignin sulfonate or soap, for example, did not oil out when the dyebath was held at 85° C. for 3 hours. It dyes cellulose acetate textile materials brilliant greenish-yellow shades which are fast to gas and which have excellent light fastness.

The new methine dye compound of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70° C.–90° C. but any suitable temperature can be used. Thus, the textile material such as cellulose acetate, for example, to be dyed or colored is ordinarily added to the dyebath at a temperature lower than that at which the main portion of the dyeing is to be effected, a temperature approximating 45° C.–55° C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:
The compound having the formula:

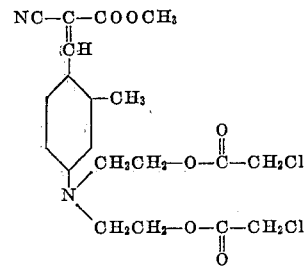

References Cited in the file of this patent
UNITED STATES PATENTS 2,179,895    Muller et al. _____ Nov. 14, 1939
2,583,614    Taylor et al. _____ Jan. 29, 1952